(12) United States Patent
Gibson

(10) Patent No.: US 10,603,565 B1
(45) Date of Patent: Mar. 31, 2020

(54) SPORTING DUMMY SLED

(71) Applicant: Arthur K. Gibson, Los Angeles, CA (US)

(72) Inventor: Arthur K. Gibson, Los Angeles, CA (US)

( * ) Notice: Subject to any disclaimer, the term of this patent is extended or adjusted under 35 U.S.C. 154(b) by 0 days.

(21) Appl. No.: 16/167,269

(22) Filed: Oct. 22, 2018

Related U.S. Application Data

(63) Continuation-in-part of application No. 15/381,613, filed on Dec. 16, 2016, now abandoned.

(51) Int. Cl.
| | | |
|---|---|---|
| *A63B 69/34* | (2006.01) | |
| *A63B 69/00* | (2006.01) | |
| *B62B 5/00* | (2006.01) | |
| *A63B 71/02* | (2006.01) | |

(52) U.S. Cl.
CPC .......... *A63B 69/34* (2013.01); *A63B 69/002* (2013.01); *B62B 5/0043* (2013.01); *B62B 5/0076* (2013.01); *A63B 2071/025* (2013.01); *B62B 2202/40* (2013.01); *B62B 2203/04* (2013.01)

(58) Field of Classification Search
CPC ..... A63B 69/345; A63B 69/002; A63B 69/34; A63B 2243/007; A63B 24/00; A63B 2225/50
See application file for complete search history.

(56) References Cited

U.S. PATENT DOCUMENTS

| | | | | |
|---|---|---|---|---|
| 3,062,548 | A * | 11/1962 | Foster ................. | A63B 69/345 434/251 |
| 3,659,848 | A * | 5/1972 | DePew ............... | A63B 69/345 473/443 |
| 3,998,456 | A * | 12/1976 | Sherman ............. | A63B 69/345 473/441 |
| 4,447,056 | A * | 5/1984 | Dalton ................ | A63B 69/345 473/442 |
| 6,261,195 | B1 * | 7/2001 | Shingleton .......... | A63B 69/345 473/438 |
| 7,235,039 | B2 * | 6/2007 | Anders ............... | A61H 1/0218 482/51 |
| 7,341,529 | B2 * | 3/2008 | Bayduke ............. | A63B 69/345 473/422 |
| 7,497,792 | B2 * | 3/2009 | Hutton ................ | A63B 69/00 473/422 |
| 7,984,910 | B1 * | 7/2011 | Nielsen ............... | A63B 63/00 273/359 |

(Continued)

*Primary Examiner* — Melba Bumgarner
*Assistant Examiner* — Amir A Klayman
(74) *Attorney, Agent, or Firm* — Quickpatents, LLC; Kevin Prince

(57) ABSTRACT

A sports training device for use on a ground surface includes motorized base mounted to a plurality of wheels connected with at least one motor, a power source, and a control circuit that includes at least one remote control receiver and is adapted to move the motorized base along the ground surface based on remote commands received by the remote control receiver. A support frame is mounted to the motorized base and holds height-adjustable vertical supports, and rotational and extendable lateral arms. A sporting dummy is fixed to a top end of each vertical support. A wireless remote control has a remote control circuit board, a power source, and a control interface, and is adapted to send the remote commands to the control circuit of the motorized base.

11 Claims, 7 Drawing Sheets

(56) References Cited

U.S. PATENT DOCUMENTS

| | | | |
|---|---|---|---|
| 2002/0147061 A1* | 10/2002 | Krause | A63B 69/004 |
| | | | 473/445 |
| 2007/0054784 A1* | 3/2007 | Wu | A47D 13/04 |
| | | | 482/69 |
| 2011/0030544 A1* | 2/2011 | Hodge | F41A 27/06 |
| | | | 89/41.05 |
| 2018/0203458 A1* | 7/2018 | Zhang | A01G 9/14 |

* cited by examiner

SPORTING DUMMY SLED

CROSS-REFERENCE TO RELATED APPLICATIONS

This application is a Continuation-in-Part of U.S. Utility application Ser. No. 15/381,613, filed on Dec. 16, 2016 and incorporated herein by reference.

STATEMENT REGARDING FEDERALLY SPONSORED RESEARCH AND DEVELOPMENT

Not Applicable.

FIELD OF THE INVENTION

This invention relates to sports training, and more particularly to football dummy sled.

DISCUSSION OF RELATED ART

Sports teams, such as football and soccer teams, often need to practice plays and strategic moves on the field with an opposing team represented by either other players or sporting dummies. When other players are not available, sporting dummies are used to represent opponents. Prior art sporting dummies, however, are typically static and therefore do not well represent an opposing player.

Therefore, there is a need for a device that allows for at least partial independent movement of a plurality of sporting dummies. Such a needed invention would provide at least three sporting dummies that are movable towards and away from each other, as well as in height, while all being rotatably movable along the sporting field in any direction by remote control. Such a needed device would be battery powered and rechargeable, and would be easily controlled by a coach or other observer. Such a needed invention would further provide for programmed movements of the device and dummies, and could provide a random feature for moving unpredictably for better representing an opposing team of players. The present invention accomplishes these objectives.

SUMMARY OF THE INVENTION

The present device is a sports training device for use on a ground surface. A motorized base comprises a rigid frame mounted to a plurality of wheels that are each connected with a motor. Each motor is connected with a power source and a control circuit. The control circuit includes a remote control receiver and is adapted to control movement of the motorized base along the ground surface based on remote commands received by the remote control receiver.

A support frame is rotationally mounted to the motorized base and extends upwardly and away from a top side of the motorized base. The support frame is adapted to hold at least one center vertical support that has a top end fixed with a sporting dummy. The support frame is further adapted to hold two opposing lateral arms at proximal ends thereof, each lateral arm adapted to hold an end vertical support at a distal end of the lateral arm. Each end vertical support has a top end that is fixed with another of the sporting dummies.

A remote control has a remote control circuit, a power source such as a battery, and a control interface. The remote control is adapted to send the remote commands wirelessly to the control circuit of the motorized base.

Preferably the motorized base is substantially rectangular in plan-view and includes the top side and a bottom side, and optionally a plurality of strengthening support brackets fixed between the top side and the bottom side of the motorized base. Each wheel is preferably mounted to a distal end of a pivoting leg that extends outwardly from a corner of the bottom side of the motorized base. Each of the four legs include a dampening mechanism such as a shock-absorber fixed between the pivoting leg and the top side of the motorized base. Each motor is connected with one of the wheels at the distal end of the pivoting leg.

The support frame is preferably rotationally mounted to the motorized base at a bearing traversing the top side of the motorized base. The support frame terminates at a worm gear rotationally disposed below the top side of the motorized base that is engaged with a worm screw that is fixed with a support frame rotating motor that is mounted below the top side of the motorized base and that is electrically connected to the power source through the control circuit. As such the control circuit is adapted to power the support frame rotating motor in either direction to cause the rotation in a corresponding direction of the support frame with respect to the motorized base.

In preferred embodiments of the invention the proximal end of each lateral arm is rotationally fixed with the support frame by at least one pivot. Each lateral arm is further fixed with the support frame through an offset linear actuator that is electrically connected with the control circuit and adapted to rate the lateral arm with respect to the support frame in either a forward or rearward direction.

Each lateral arm preferably includes at least two telescoping members, extending away from the support frame. At least one of the telescoping members, includes a parallel linear actuator fixed between the proximal end of the lateral arm and the distal end of the lateral arm. As such, extension of the parallel linear actuator by the control circuit telescopically extends the lateral arm between a retracted position and an extended position wherein the distal ends of each lateral arm extend from the support frame beyond the motorized base, that is, beyond the projection of the motorized base upon the ground surface.

The center vertical support and each end vertical support each include a height adjustment mechanism, such that the height of the sporting dummy on each support, with respect to the motorized base can be selected. Preferably such a height adjustment mechanism includes a manually selectable telescoping rod arrangement that includes apertures through both an inner rod and an outer rod through which a locking pin can be inserted when the desired apertures of both the inner rod and the outer rod are aligned.

Preferably the control interface of the remote control includes a speed control for moving the motorized base forward and backward by activating all of the wheel motors in the same direction at the same speed simultaneously. A steering control moves the wheel motors on one side of the motorized base in one direction at one speed, while commanding the wheel motors on the other side of the motorized base at a different speed, such that the motorized base turns accordingly.

Preferably the control interface of the remote control further includes two dummy extension controls for controlling the parallel linear actuator of each lateral arm, so as to command the parallel linear actuator to either extend or retract the distal ends of the lateral arms. Further, a support frame rotational control may be further included for controlling the frame rotating motor to rotate the support frame in either a clockwise or counter-clockwise direction. A lateral arm rotational control controls the offset linear actuator of each lateral arm to rotate each lateral arm in either a forward or backward direction.

The present invention is a device that allows for at least partial independent movement of a plurality of sporting dummies. The present device provides at least three sporting dummies that are movable towards and away from each other, as well as in height, while all being movable and rotatable along the sporting field in any direction by remote control. The present invention is battery powered and rechargeable, and is easily controlled by a coach or other observer. The present device further provides for programmed movements of the device and dummies, and provides a random feature for moving unpredictably for better representing an opposing team of players. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
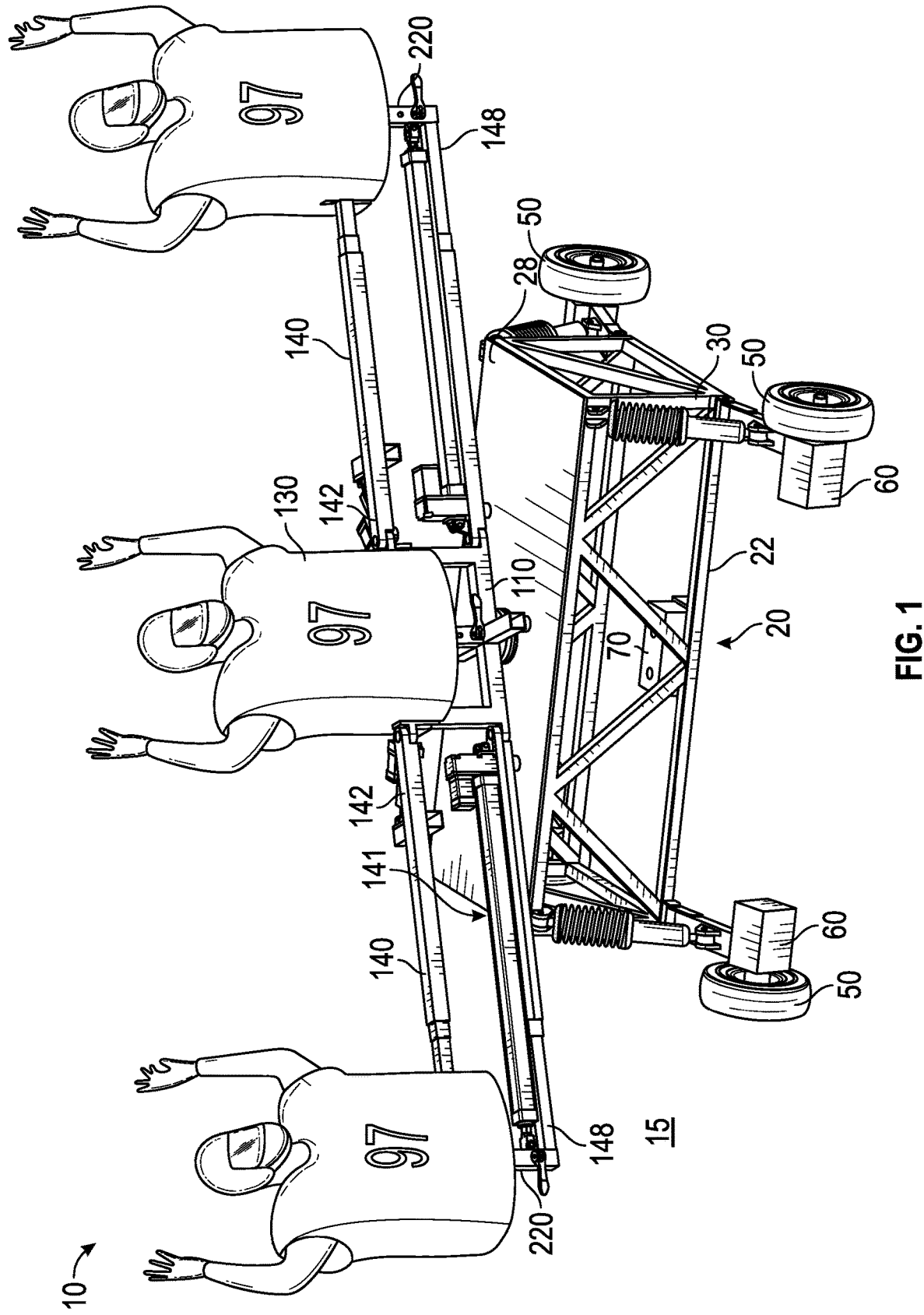
FIG. 1 is a perspective view of the invention, illustrated with two lateral arms each in a retracted position.
Figure 2:
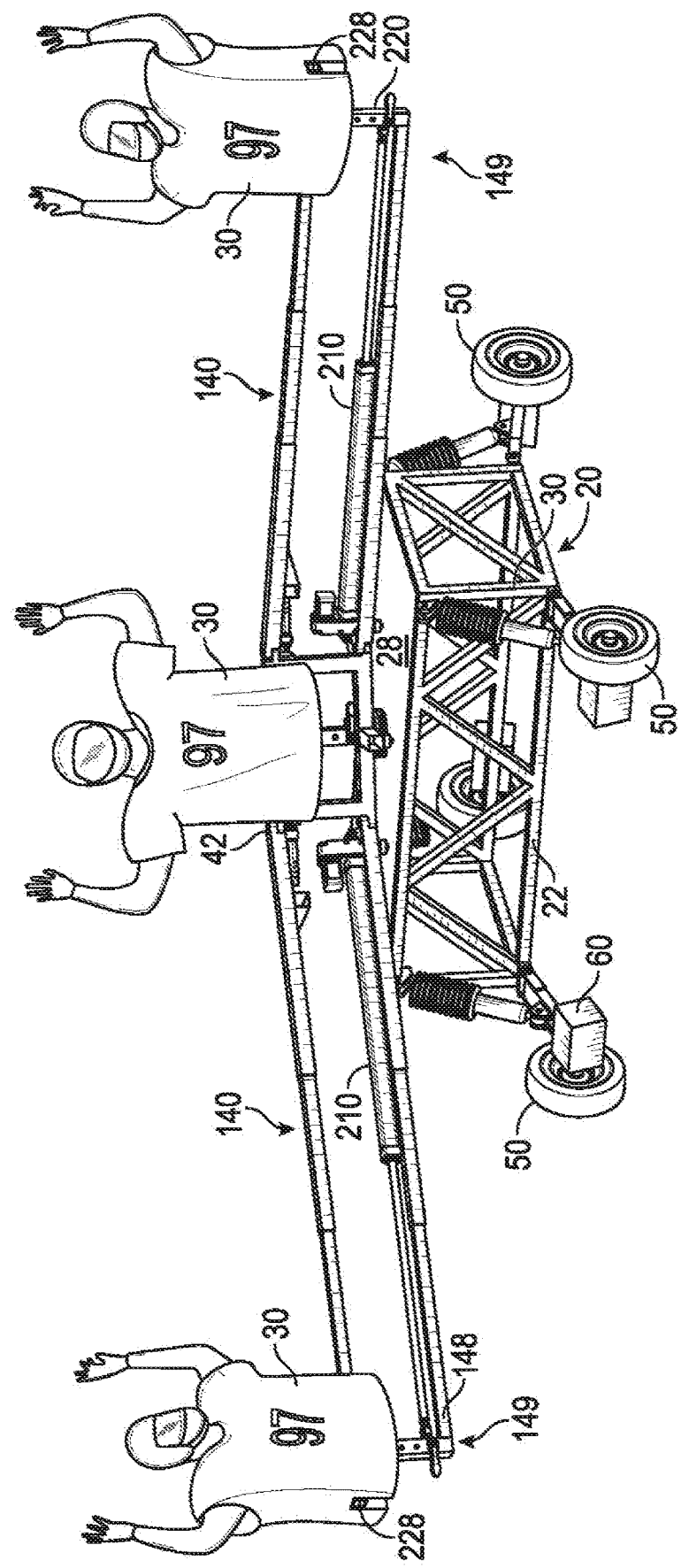
FIG. 2 is a perspective view of the invention, illustrated with the lateral arms each in an extended position.
Figure 3:
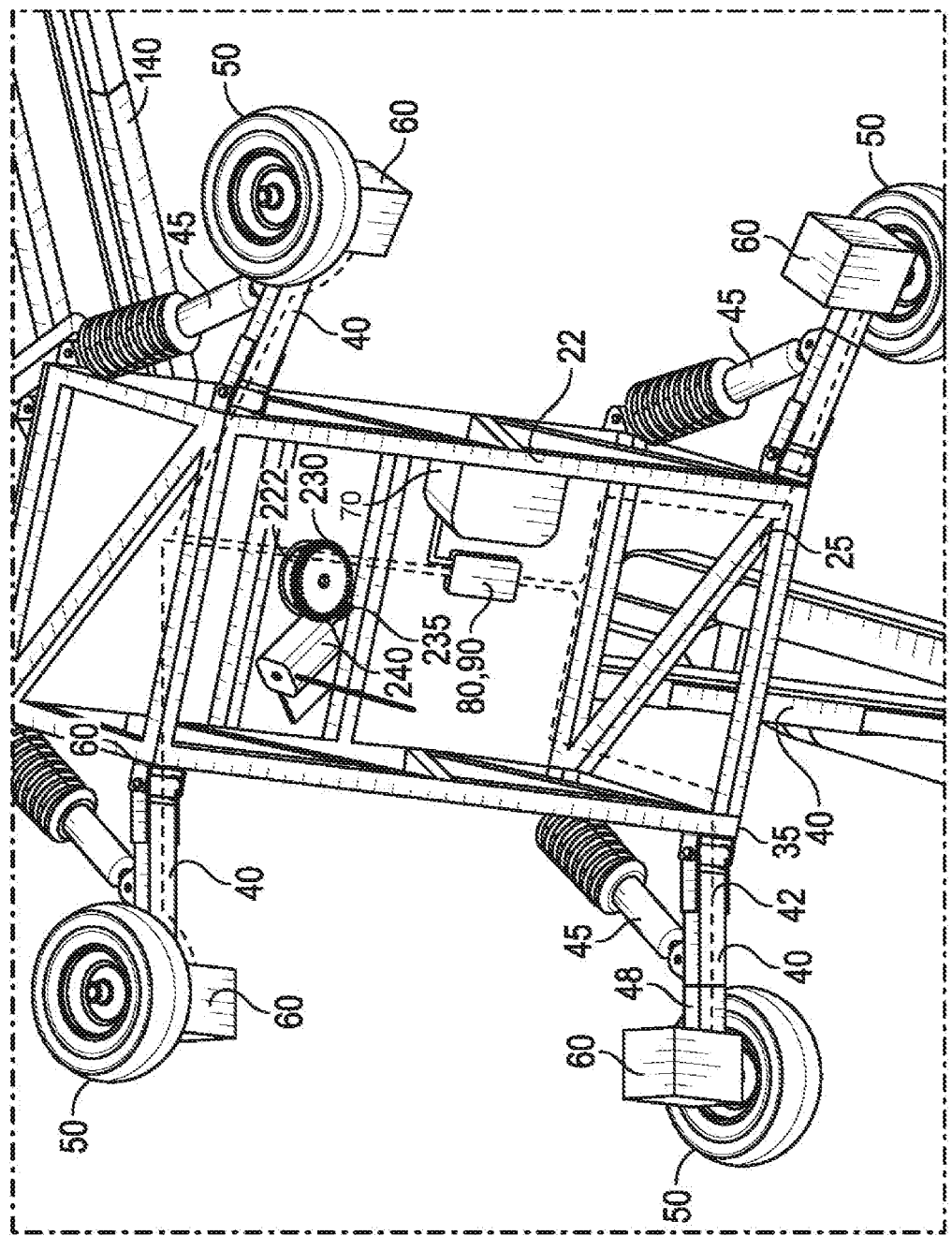
FIG. 3 is a partial bottom perspective view of the invention, illustrating a motorized base with a motorized support frame rotational mounting mechanism.
Figure 4:
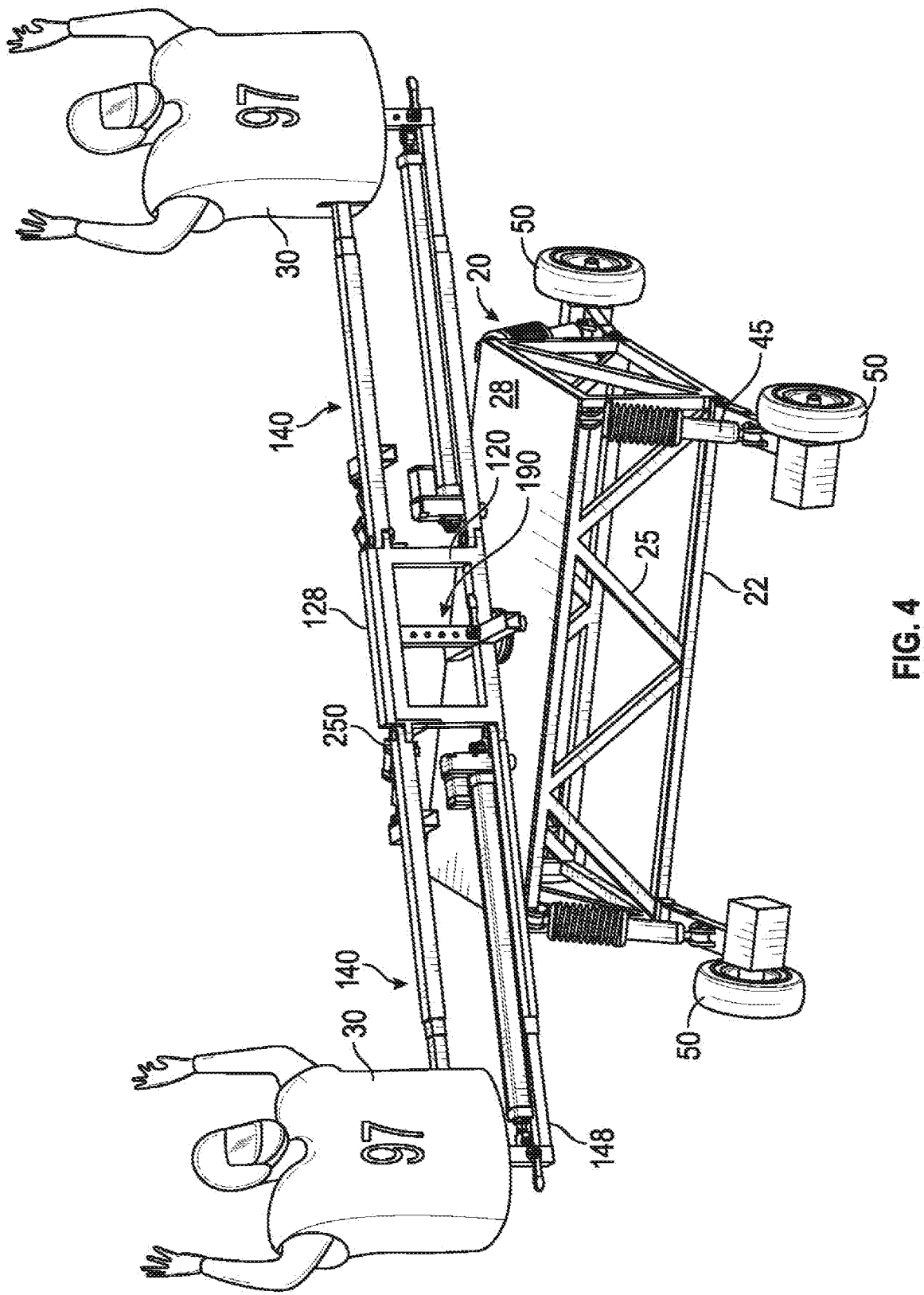
FIG. 4 is a perspective view of the invention, illustrated with one of three sporting dummies omitted to reveal a height adjustment mechanism of the invention.

FIGS. 1-3 illustrate a sports training device 10 for use on a ground surface 15. A motorized base 20 comprises a rigid frame 30 mounted to a plurality of wheels 50 that are each connected with a motor 60. Each motor 60 is connected with a power source 70 (FIG. 3) and a control circuit 80. The control circuit 80 includes a remote control receiver 90 and is adapted to control movement of the motorized base 20 along the ground surface 15 based on remote commands received by the remote control receiver 90.

A support frame 110 is rotationally mounted to the motorized base 20 and extends upwardly and away from a top side 28 of the motorized base. The support frame 110 is adapted to hold at least one center vertical support 120 that has a top end 128 fixed with a sporting dummy 130. The support frame 110 is further adapted to hold two opposing lateral arms 140 at proximal ends 142 thereof, each lateral arm 140 adapted to hold an end vertical support 220 at a distal end 148 of the lateral arm 140. Each end vertical support has a top end 228 that is fixed with another of the sporting dummies 130.

A remote control 150 has a remote control circuit 160k, a power source 170 such as a battery, and a control interface 180. The remote control 150 is adapted to send the remote commands wirelessly to the control circuit 80 of the motorized base 20.

Preferably the motorized base 20 is substantially rectangular in plan view and includes the top side 28 and a bottom side 22, and optionally a plurality of strengthening support brackets 25 fixed between the top side 28 and the bottom side 22 of the motorized base 20. Each wheel 50 is preferably mounted to a distal end 48 of a pivoting leg 40 that extends outwardly from a corner 35 of the bottom side 22 of the motorized base 20. Each of the four legs 40 include a dampening mechanism 45 such as a shock-absorber fixed between the pivoting leg 40 and the top side 28 of the motorized base 20. Each motor 60 is connected with one of the wheels 50 at the distal end 48 of the pivoting leg 40.

The support frame 110 is preferably rotationally mounted to the motorized base 20 at a bearing 222 traversing the top side 28 of the motorized base 20. The support frame 110 terminates at a worm gear 230 (FIG. 3) rotationally disposed below the top side 28 of the motorized base 20 that is engaged with a worm screw 235 that is fixed with a support frame rotating motor 240 that is mounted below the top side 28 of the motorized base 20 and that is electrically connected to the power source 70 through the control circuit 80. As such the control circuit 80 is adapted to power the support frame rotating motor 240 in either direction to cause the rotation in a corresponding direction of the support frame 110 with respect to the motorized base 20.

Figure 5:
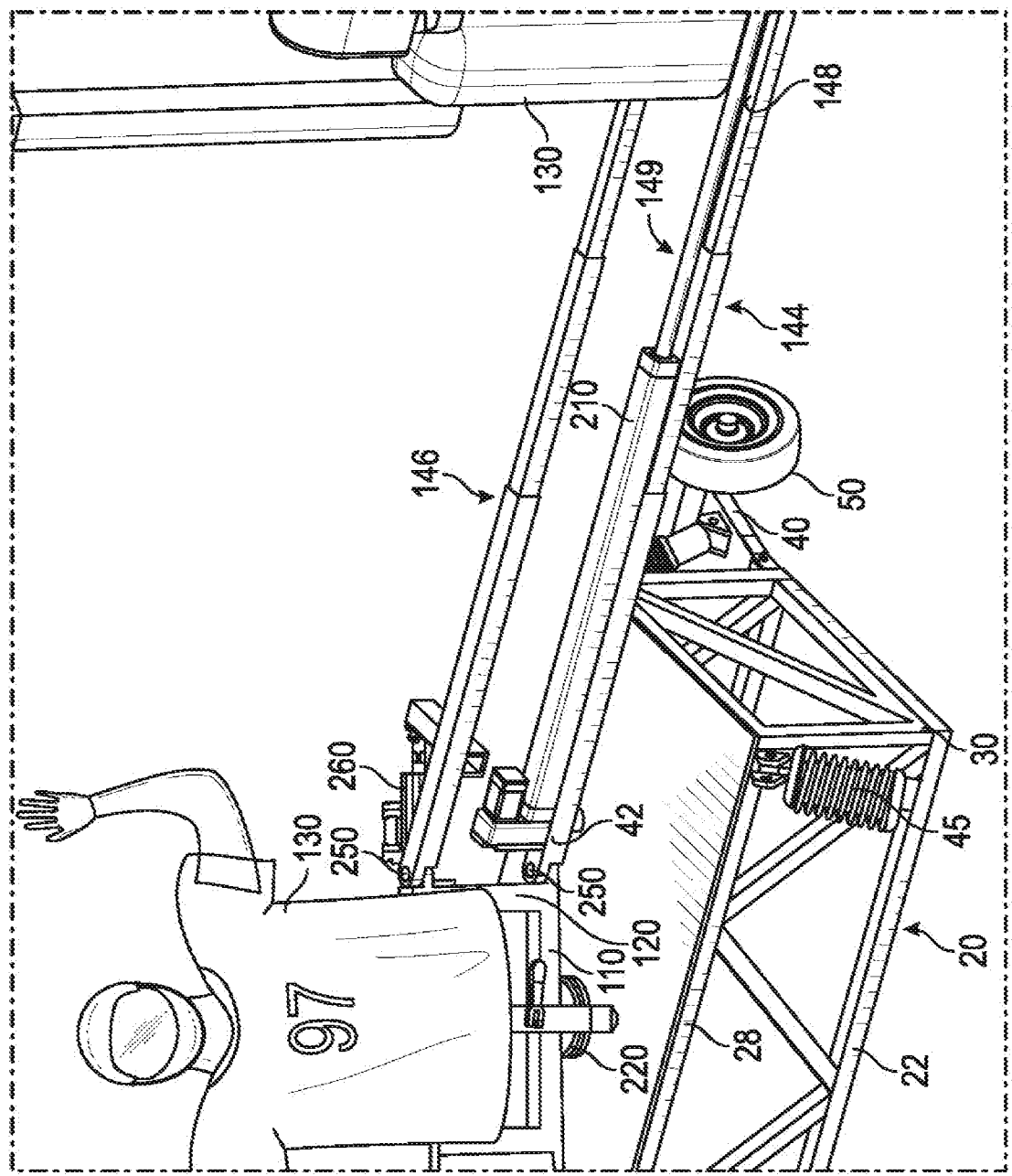
FIG. 5 is a partial perspective view of the invention, illustrating lateral arm pivots and an offset linear actuator for rotating each lateral arm with respect to the motorized base.

In preferred embodiments of the invention the proximal end 142 of each lateral arm 140 is rotationally fixed with the support frame 110 by at least one pivot 250 (FIG. 5). Each lateral arm 140 is further fixed with the support frame 110 through an offset linear actuator 260 that is electrically connected with the control circuit 80 and adapted to rate the lateral arm 140 with respect to the support frame 110 in either a forward or rearward direction.

Each lateral arm preferably includes at least two telescoping members 144,146 extending away from the support frame 110. At least one of the telescoping members 144,146 includes a parallel linear actuator 210 fixed between the proximal end 142 of the lateral arm 140 and the distal end 148 of the lateral arm 140. As such, extension of the parallel linear actuator 210 by the control circuit 80 telescopically extends the lateral arm 140 between a retracted position 141 (FIG. 1) and an extended position 149 (FIG. 2) wherein the distal ends 148 of each lateral arm 140 extend from the support frame 110 beyond the motorized base 20 (FIG. 2), that is, beyond the projection of the motorized base 20 upon the ground surface 15.

Figure 7:
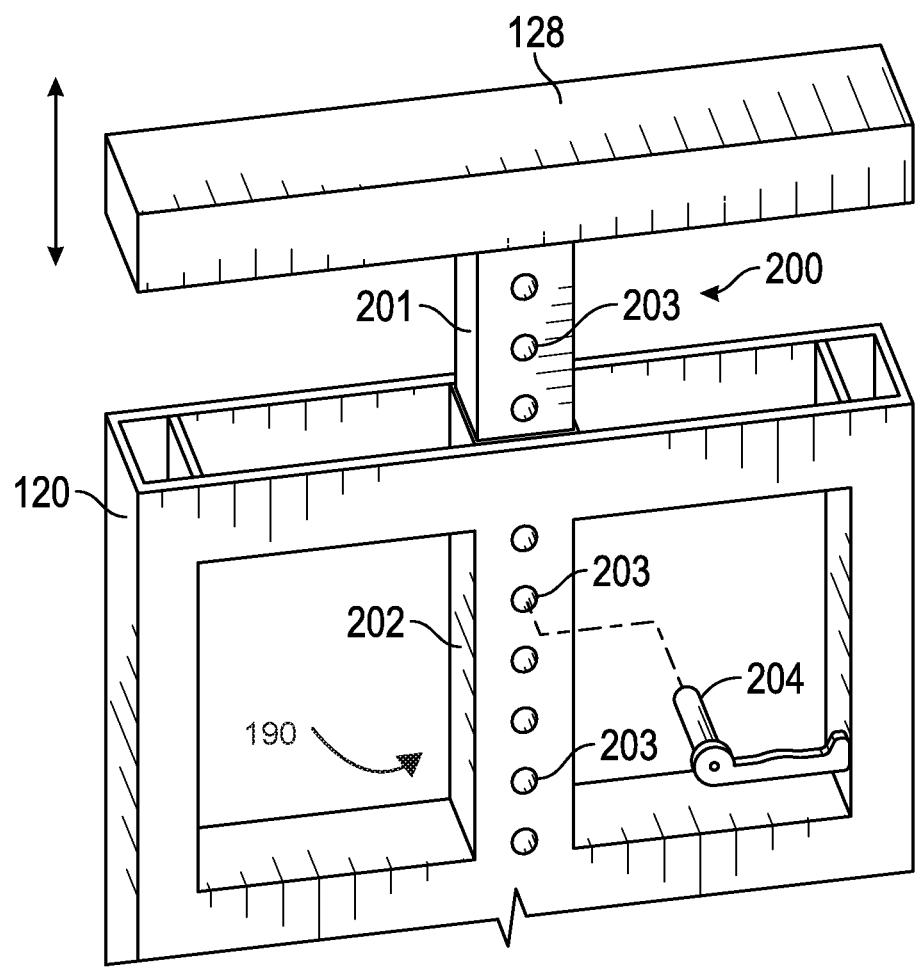
FIG. 7 is a perspective view of the height adjustment mechanism of the invention.

The center vertical support 120 and each end vertical support 220 each include a height adjustment mechanism 190 (FIG. 7), such that the height of the sporting dummy 130 on each support 120,220 with respect to the motorized base 20 can be selected. Preferably such a height adjustment mechanism includes a manually selectable telescoping rod arrangement 200 that includes apertures 203 through both an inner rod 201 and an outer rod 202 through which a locking pin 204 can be inserted when the desired apertures 203 of both the inner rod 201 and the outer rod 202 are aligned.

Figure 6:
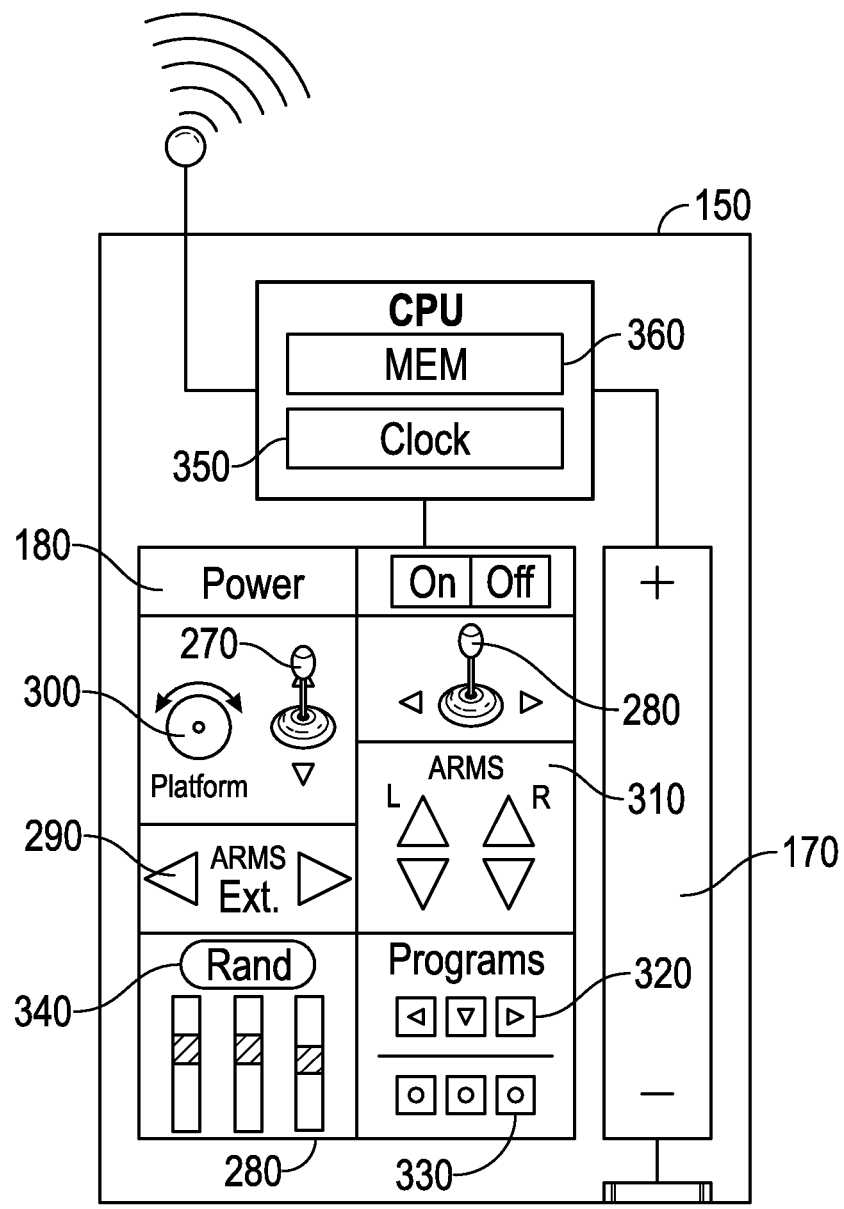
FIG. 6 is a diagram of a remote control of the invention.

Preferably the control interface 180 of the remote control 150 includes a speed control 270 (FIG. 6) for moving the motorized base 20 forward and backward by activating all of the wheel motors 60 in the same direction at the same speed simultaneously. A steering control 280 moves the wheel motors 60 on one side of the motorized base 20 in one direction at one speed, while commanding the wheel motors 60 on the other side of the motorized base 20 at a different speed, such that the motorized base 20 turns accordingly.

Preferably the control interface 180 of the remote control 150 further includes two dummy extension controls 290 (FIG. 6) for controlling the parallel linear actuator 210 of each lateral arm 140, so as to command the parallel linear actuator 210 to either extend or retract the distal ends 148 of the lateral arms 140. Further, a support frame rotational control 300 may be further included for controlling the frame rotating motor 240 to rotate the support frame 110 in either a clockwise or counter-clockwise direction. A lateral arm rotational control 310 controls the offset linear actuator 260 of each lateral arm 140 to rotate each lateral arm 140 in either a forward or backward direction.

Preferably the motorized base is made from a suitably strong rigid material, such as steel frames and a steel plate for the top side 28 thereof. The support frame and lateral arms are preferably also made from a suitably strong rigid material, such as steel square tubing.

The sporting dummies 130 are preferably made out of a foam material or plastic that will absorb the impact of footballs, or the like.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A sports training device for use on a ground surface, comprising:

a motorized base comprising a rigid frame mounted to a plurality of wheels each connected with a wheel motor, a power source operable to drive each wheel motor, and a control circuit, the control circuit including a remote control receiver and adapted to control movement of the motorized base along the ground surface based on remote commands received by the remote control receiver, the motorized base being substantially rectangular in plan-view and includes a top side and a bottom side, and wherein each wheel is mounted to a distal end of a pivoting leg that extends outwardly from a corner of the bottom side of the motorized base, the leg including a dampening mechanism fixed between the pivoting leg and the top side of the motorized base, each wheel motor connected with one of the wheels at the distal end of the pivoting leg, a plurality of strengthening support brackets being fixed between the top side and the bottom side of the motorized base;

a support frame rotationally mounted to the motorized base and extending upwardly and away from the top side of the motorized base, the support frame adapted to hold at least one center vertical support having a top end thereof fixed with a sporting dummy, the support frame being rotationally mounted to the motorized base at a bearing traversing the top side of the motorized base, the support frame terminating at a worm gear rotationally disposed below the top side of the motorized base that is engaged with a worm screw that is fixed with a support frame rotating motor that is mounted below the top side of the motorized base and electrically connected to the power source through the control circuit such that the control circuit is adapted to power the support frame rotating motor in either direction to cause the rotation in a corresponding direction of the support frame with respect to the motorized base;

the support frame further adapted to hold two opposing lateral arms at proximal ends thereof, each lateral arm adapted to hold at a distal end thereof an end vertical support, each end vertical support having a top end thereof fixed with another sporting dummy, the proximal end of each lateral arm being rotationally fixed with the support frame by at least one pivot, each lateral arm further fixed with the support frame through an offset linear actuator that is electrically connected with the control circuit and adapted to rotate the lateral arm with respect to the support frame in either a forward or rearward direction, each lateral arm including two telescoping members extending away from the support frame, at least one of the telescoping members including a parallel linear actuator fixed between the proximal end of the lateral arm and the distal end of the lateral arm such that extension of the parallel linear actuator telescopically extends the lateral arm between a retracted position and an extended position;

the center vertical support and each end vertical support including a height adjustment mechanism such that the height of the sporting dummy on each support with respect to the motorized base can be selected, the height adjustment mechanism of each support being a manually-selectable telescoping rod arrangement that includes apertures through both an inner and outer rod through which a locking pin can be inserted when desired apertures of both the inner and outer rods are aligned; and a remote control having a remote control circuit, a power source, and a control interface, the remote control adapted to send the remote commands wirelessly to the control circuit of the motorized base.

2. The sports training device of claim 1 wherein the control interface of the remote control includes a speed control for moving the motorized base forward and backward by activating all of the wheel motors in the same direction at the same speed simultaneously.

3. The sports training device of claim 1 wherein the control interface of the remote control includes a steering control for moving the wheel motors on one side of the motorized base in one direction at one speed, while commanding the wheel motors on the other side of the motorized base at a different speed, whereby the motorized base is turned accordingly.

4. The sports training device of claim 1 wherein the control interface of the remote control includes two dummy extension controls for controlling the parallel linear actuator of each lateral arm, to command the parallel linear actuator to either extend or retract the distal ends of the lateral arms.

5. The sports training device of claim 1 wherein the control interface of the remote control includes a support frame rotational control for controlling the frame rotating motor to rotate the support frame in either a clockwise or counter-clockwise direction.

6. The sporting training device of claim 1 wherein the control interface further includes a lateral arm rotational control for controlling the offset linear actuator of each lateral arm to rotating each lateral arm in either a forward or backward direction.

7. A sports training device for use on a ground surface, comprising:

a motorized base comprising a rigid frame mounted to a plurality of wheels each connected with a wheel motor, a power source operable to drive each of the plurality of wheels, and a control circuit, the control circuit including a remote control receiver and adapted to control movement of the motorized base along the ground surface based on remote commands received by the remote control receiver the motorized base being substantially rectangular in plan-view and includes a top side and a bottom side, and wherein each wheel is mounted to a distal end of a pivoting leg that extends outwardly from a corner of the bottom side of the motorized base;

a support frame rotationally mounted to the motorized base and extending upwardly and away from the top side of the motorized base, the support frame adapted to hold at least one center vertical support having a top end thereof fixed with a sporting dummy, the support frame further adapted to hold two opposing lateral arms at proximal ends thereof, each lateral arm adapted to hold at a distal end thereof an end vertical support, each end vertical support having a top end thereof fixed with another sporting dummy; and a remote control having a remote control circuit, a power source, and a control interface, the remote control adapted to send the remote commands wirelessly to the control circuit of the motorized base, wherein wherein the proximal end of each lateral arm is rotationally fixed with the support frame by at least one pivot, each lateral arm further fixed with the support frame through an offset linear actuator that is electrically connected with the control circuit and adapted to rotate the lateral arm with respect to the support frame in either a forward or rearward direction; and each lateral arm includes two telescoping members extending away from the support frame, at least one of the telescoping members including a parallel linear actuator fixed between the proximal end of the lateral arm and the distal end of the lateral arm;

whereby extension of the parallel linear actuator by the control circuit telescopically extends the lateral arm between a retracted position and an extended position.

8. The sports training device of claim 7 further including a dampening mechanism fixed between the pivoting leg and the top side of the motorized base, each wheel motor connected with one of the wheels at the distal end of the pivoting leg.

9. The sports training device of claim 7 wherein the support frame is rotationally mounted to the motorized base at a bearing traversing the top side of the motorized base, the support frame terminating at a worm gear rotationally disposed below the top side of the motorized base that is engaged with a worm screw that is fixed with a support frame rotating motor that is mounted below the top side of the motorized base and electrically connected to the power source through the control circuit;

whereby the control circuit is adapted to power the support frame rotating motor in either direction to cause the rotation in a corresponding direction of the support frame with respect to the motorized base.

10. The sports training device of claim 7 wherein the center vertical support and each end vertical support include a height adjustment mechanism, whereby the height of the sporting dummy on each support with respect to the motorized base can be selected.

11. The sports training device of claim 7 wherein the distal ends of each lateral arm extend from the support frame beyond the motorized base.

\* \* \* \* \*